June 5, 1956　　　　　　J. P. RUTH　　　　　　2,749,258
SUGAR DIFFUSING APPARATUS
Filed Aug. 1, 1952
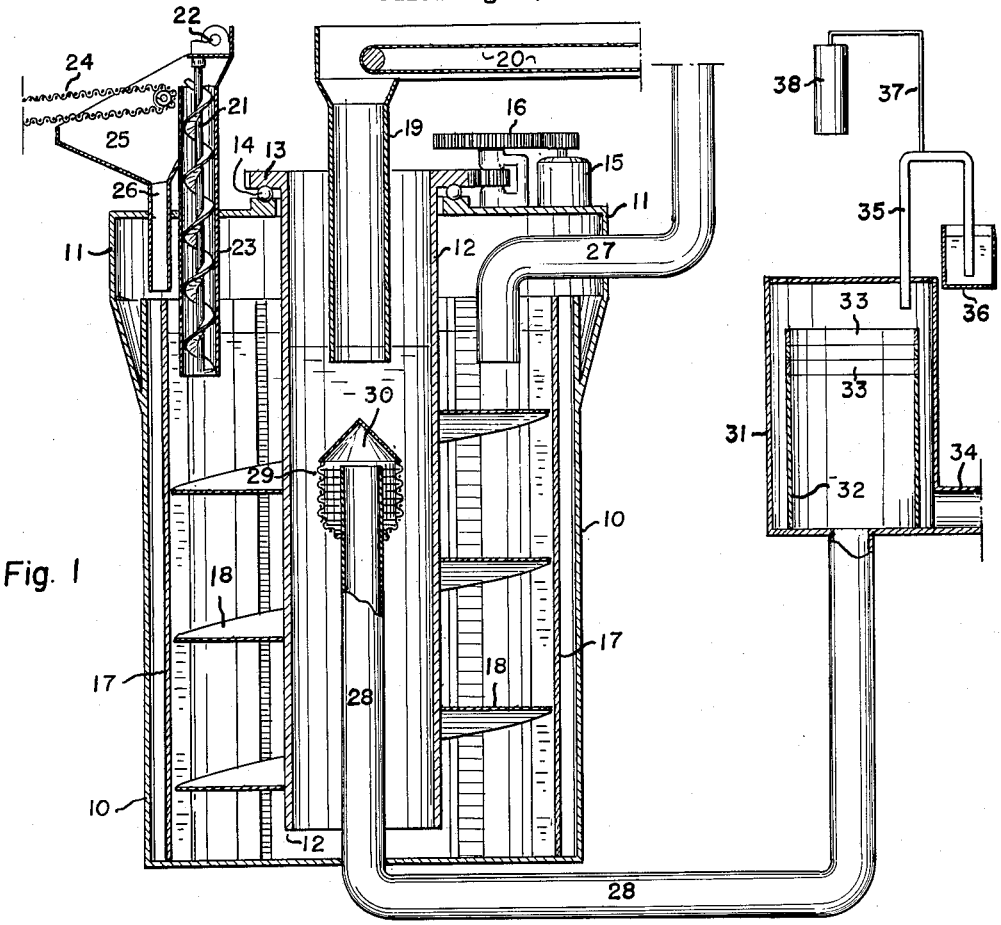
Fig. 1
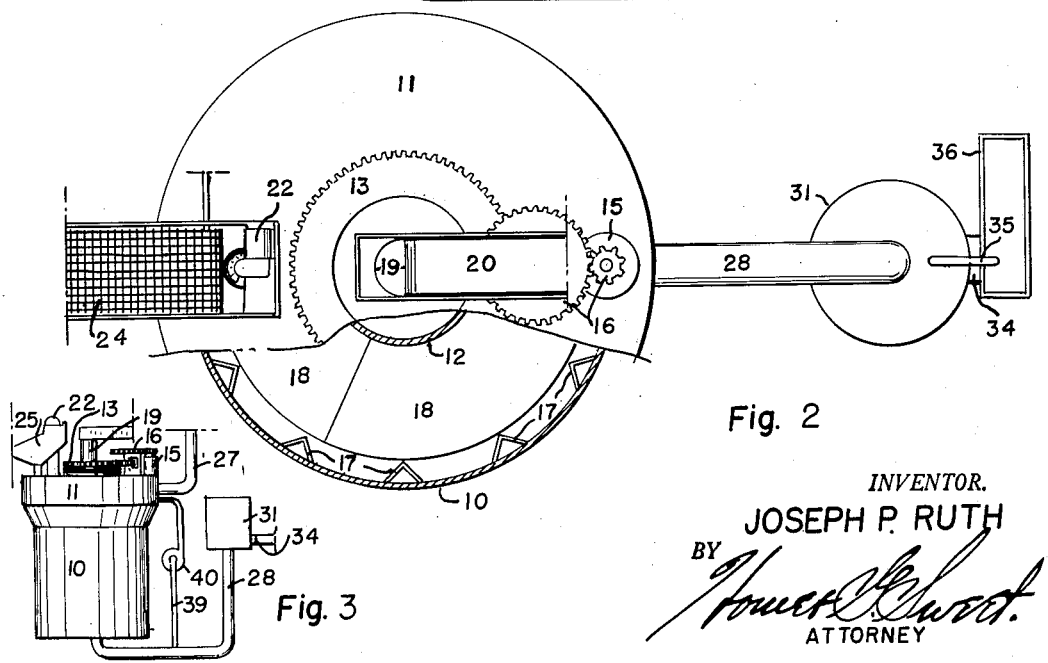
Fig. 2
Fig. 3
INVENTOR.
JOSEPH P. RUTH
BY
ATTORNEY

2,749,258

Patented June 5, 1956

2,749,258
SUGAR DIFFUSING APPARATUS

Joseph P. Ruth, Denver, Colo.

Application August 1, 1952, Serial No. 302,151

8 Claims. (Cl. 127—7)

This invention relates to apparatus, such as a diffusion cell or unit, for the extraction of sugar content from sugar beet material, and the like, and has as an object to provide novel and improved means for the continuous leaching of sugar content from sugar beet material with expedition and efficiency.

A further object of the invention is to provide novel and improved sugar diffusing apparatus characterized by means for the continuous withdrawal of solution from the zone of maximum sugar content concentration.

A further object of the invention is to provide novel and improved sugar diffusing apparatus characterized by a circulation of solution therethrough in a direction counter to that of the sugar-bearing material treated therein.

A further object of the invention is to provide novel and improved sugar diffusing apparatus wherein the outflow of concentrated solution is correlated with and susceptible of regulation by the input of fresh liquid supply.

A further object of the invention is to provide novel and improved sugar diffusing apparatus arranged for the continuous input of sugar-bearing material adjacent the zone of concentrated solution withdrawal and continuous removal of such material, after leaching, from a solution area remote from said zone of solution withdrawal.

A further object of the invention is to provide novel and improved sugar diffusing apparatus adapted for the repetitious circulation of solution as a counterflow through a circulation of sugar-bearing material, thus to develop a desired high concentration of sugar content in the solution.

A further object of the invention is to provide novel and improved sugar diffusing apparatus that is simple and economical of construction, installation, and operation, compact in relation to operative capacity, susceptible of automatic functioning in any of various adjusted conditions, and efficient in extracting sugar content from natural sugar-bearing materials.

With the foregoing and other objects in view, my invention consists in the construction, arrangement, and combination of elements as hereinafter set forth, pointed out in my claims, and illustrated by the accompanying drawing, in which—

Figure 1 is a vertical section taken substantially axially through a typical embodiment of the invention as arranged ready for practical use, certain associated elements not essential to an understanding of the apparatus being broken away or omitted.

Figure 2 is a top plan view of the organization according to Figure 1, certain elements being broken away to illustrate otherwise concealed construction.

Figure 3 is a side elevation of the organization according to Figure 1 on a relatively reduced scale and as modified within the contemplation of the invention.

In the processing of sugar beet, and analogous, material for the extraction and recovery of its sugar content, conventional practices include subdivision of the natural material into fragments of appropriate size, known as cossettes, and leaching of such cossettes in water to which the sugar content of the material readily transfers in solution. Effective and efficient leaching of the cossettes has been heretofore difficult of realization, and the instant invention is hence directed to the provision of improved means and apparatus adapted to continuously act upon cossette material passed therethrough with high and efficient recovery of sugar content from such material and continuous delivery of highly-concentrated sugar-bearing solution.

As shown, the various elements of the improved apparatus are associated and cooperate with a cylindrical, open-top tank or vat 10 adapted to confine a charge of liquid, and a flat-top hood 11 closes about and spacedly across the open upper end of said tank 10. The flat top member of the hood 11 is centrally apertured to freely accommodate a tubular, open-ended well 12 disposed therethrough and coaxially within the tank 10. The well 12 fixedly carries a gear 13 on and as a flange radially and outwardly about its open upper end in position to overlie the adjacent area of the hood 11 flat top member and an anti-friction bearing 14 engaged between spacedly-adjacent surface areas of said gear and hood flat top member rotatably supports said well relative to and in depending relation within the tank 10 with the well lower end spaced moderately above the tank floor. In any expedient arrangement, a source of power, such as an electric motor 15, acts through a gear train 16 to rotatively drive the gear 13 and the associated well 12 in a selected direction and at a desired speed about the axis common to said well and the tank 10. The inner cylindrical wall of the tank 10 is preferably vertically ribbed, as at 17, to minimize circulatory effects interiorly of the tank incident to well 12 rotation, and a continuous spiral flight 18 fixed exteriorly about and to outstand radially from the well 12 portion within the tank 10 substantially bridges the area between said well and inner margins of the ribs 17 in a pitch, or inclination, productive of elevating effect when the well is rotated in the predetermined direction.

Delivery of cossettes to the apparatus is had through a spout 19 fixed coaxially and through the open upper end of the well 12 in a length to rise well above said well and to intersect the normal liquid level within said well at its lower end, regulated supply of cossettes to and for delivery through the spout 19 being had through the agency of an endless-type conveyor 20, or equivalent means, susceptible of regulable power drive in an obvious manner. The tank 10 being charged with water to a level slightly below the tank open top margin the water will stand at a corresponding level within the well 12, so that, as the well is rotatively driven and cossette material is infed through the spout 19 the cosette material will sink through the water column within the well, escape through the space between the well lower end and the floor of the tank 10, and be engaged and gradually elevated through the tank area exterior to said well by the flight 18 rotating with the well, all with continuing moderate agitation and tumbling of the cossettes such as will thoroughly expose the material to leaching action of the water through which it is caused to pass. After their leaching transit through the water charge of the apparatus, the cossettes are near the surface of the water charge portion exterior to the well 12, from which position they are removed at a desired rate by means of a spiral conveyor 21 coactably rotatable by means of an independent drive 22 within a tube 23 vertically intersecting the hood flat top member at one side of the tank 10 and terminating within the tank water charge in clearing relation with the upper end of the flight 18. Exteriorly of and above the hood 11, the spiral conveyor 21 and its tube 23 deliver to an endless-type conveyor 24, expediently powered by the drive 22, whereby the extracted cossette material may be directed to waste, storage, or other processing, and a hopper 25 surrounding the output end of the tube 23 and underlying the receiving end of the conveyor 24 collects and directs drainage from the extracted cossettes through a return 26 to the tank 10 interior.

The water charge of the tank 10 is supplied and maintained through a flow line 27 arranged for regulation of flow therethrough in any expedient manner, said line 27 conveniently entering through a side of the hood 11 remote from the conveyor 21 and its tube 23 and terminating in a downwardly-directed output end below the normal liquid level of the tank. For withdrawal of solution at maximum concentration from the apparatus in a manner to establish a circulation of solution within the apparatus in a direction counter to that of cossette travel therein, with consequent exposure of the partially-leached cossettes to water of minimum sugar content, an outflow line 28 upstands through the floor of the tank 10 in coaxial relation within the well 12 to terminate in an intake end spacedly adjacent and below the lower end of the spout 19; the said intake end of the line 28 being screened, as at 29, and expediently furnished with an upwardly-directed, conical cap 30 arranged to laterally and downwardly deflect cossette material delivered through said spout. Exteriorly of the tank 10, the line 28 is directed upwardly to open and deliver through the floor of a housing 31 disposed to upstand through and across the plane of the desired water level of the tank, and a tubular baffle 32 is fixed to and rises from the floor of the housing 31 about the output end of the line 28 to support a superposed series of removable and replaceable rings 33 in spaced relation below the housing top closure and altitudinally across the water level desired for the tank. An outflow 34 from and adjacent the floor of the housing 31 is provided for transfer of solution from said housing to the further processing phases and agents appropriate to the treatment of the sugar-charged solution. To maintain the interior of the housing 31 at atmospheric pressure the same as that obtaining in the tank 10 and well 12 and to simultaneously shield the solution passing through said housing from the oxidizing effect of air, an inverted U-shaped tube 35 has one of its open-end legs sealed through the top of said housing and the other of its open-end legs immersed in the water charge of a container 36 supported exteriorly adjacent the housing and a line 37 connects an intermediate portion of said tube 35 with a container 38, or supply, of suitable inert gas at nominal pressure. Thus, with the system in operation and the air within the housing 31 supplanted by inert gas from the container or supply 38, any excess pressure within the housing may bubble off through the tube 35 and container 36 charge and any reduction of pressure within said housing is immediately corrected by inflow of inert gas thereto through the line 37 and tube 35. It is the function of the housing 31, baffle 32, and rings 33 to determine and maintain a desired water level in the tank 10 and well 12 and to proportion withdrawal of solution from the well through the line 28 to the input of fresh water had through the line 27. As should be obvious, the water level of the tank 10 will rise in response to inflow through the line 27 until the corresponding rise of solution within the baffle 32 tops the uppermost of the rings 33, whereafter the tank level will be stabilized at about the plane of the topmost ring 33 margin and further supply through the line 27 to the tank 10 is reflected as outflow through the line 28, baffle 32, housing 31, and outflow 34; such outflow through the line 28 being in the form of concentrated solution withdrawn from the well 12 adjacent the zone of cossette input to which the tank water is caused to circulate, with progressive leaching effect on the cossette charge, by virtue of the constructions and arrangements set forth.

When it is desired to repetitiously circulate the withdrawn solution for enhanced concentration thereof, a by-pass 39 through a circulating pump 40 may be connected between the line 28 and a point of introduction to the tank 10 adjacent the line 27 input, as represented in Figure 3, thus to divert a portion of the outflow through said line 28 back to and for repassage through the tank 10 where it is reexposed to cossettes circulating through the tank.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, means for the continuous infeed of sugar-bearing material through the upper end and to the interior of said well, a continuous spiral flight exteriorly about and rotatable with said well for the elevation of infed material from the foot of said well through the tank area exterior to the well, means for the continuous removal of elevated material from upper regions of the tank area exterior to said well, means for the continuous supply of water to upper regions of the tank area exterior to said well, an outflow line for continuously withdrawing solution from an upper zone of the well interior, and a trap in said line exteriorly of the tank and across the normal tank liquid level plane, whereby to determine the tank liquid level.

2. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, means for the continuous infeed of sugar-bearing material through the upper end and to the interior of said well, a continuous spiral flight exteriorly about and rotatable with said well for the elevation of infed material from the foot of said well through the tank area exterior to the well, means for the continuous removal of elevated material from upper regions of the tank area exterior to said well, means for the continuous supply of water to upper regions of the tank area exterior to said well, an outflow line for continuously withdrawing solution from an upper zone of the well interior, a trap in said line exteriorly of the tank and across the normal tank liquid level plane, whereby to determine the tank liquid level, and means conditioning said trap for the exclusion therefrom of solution-oxidizing air while maintaining the trap interior at atmospheric pressure.

3. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, a spout through the upper end and opening interiorly of said well, a conveyor serving said spout for the continuous infeed of sugar-bearing material thereto, a continuous spiral flight exteriorly about and rotatable with said well for the elevation of infed material from the foot of said well through the tank area exterior to the well, means for the continuous removal of elevated material from upper regions of the tank area exterior to said well, means for the continuous supply of water to upper regions of the tank area exterior to said well, an outflow line for continuously withdrawing solution from an upper zone of the well interior, and a trap in said line exteriorly of the tank and across the normal tank liquid level plane, whereby to determine the tank liquid level.

4. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, a spout through the upper end and opening interiorly of said well, a conveyor serving said spout for the continuous infeed of sugar-bearing material thereto, a continuous spiral flight exteriorly about and rotatable with said well for the elevation of infed material from the foot of said well through the tank area exterior to the well, a tube-housed, spiral conveyor engaged at its intake end in an upper region of the tank area exterior to the well and rotatably powered for the continuous removal of elevated material from said region, means for the continuous supply of water to upper regions of the tank area exterior to the well, an outflow line for continuously withdrawing solution from an upper zone of the well interior, and a trap in said line exteriorly of the tank and across the normal tank liquid level plane, whereby to determine the tank liquid level.

5. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, means for the continuous infeed of sugar-bearing material through the upper end and to the interior of said well, a continuous spiral flight exteriorly about and rotatable with said well for the elevation of infed material from the foot of said well through the tank area exterior to the well, means for the continuous removal of elevated material from upper regions of the tank area exterior to the well, a water inflow line delivering to upper regions of the tank area exterior to the well, a solution outflow line upstanding through the tank floor and axially of said well to dispose its intake end at an upper zone of the well interior, and a trap in said outflow line exteriorly of the tank and across the normal tank liquid level plane, whereby to determine the tank liquid level.

6. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, a spout through the upper end and opening interiorly of said well, a conveyor serving said spout for the continuous infeed of sugar-bearing material thereto, a continuous spiral flight exteriorly about and rotatable with said well for the elevation of infed material from the foot of said well through the tank area exterior to the well, a tube-housed, spiral conveyor engaged at its intake end in an upper region of the tank area exterior to the well and rotatably powered for the continuous removal of elevated material from said region, a water inflow line delivering to upper regions of the tank area exterior to the well, a solution outflow line upstanding through the tank floor and axially of said well to dispose its intake end at an upper zone of the well interior, and a trap in said outflow line exteriorly of the tank and across the normal tank liquid level plane, whereby to determine the tank liquid level.

7. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, means for the continuous infeed of sugar-bearing material through the upper end and to the interior of said well, a continuous spiral flight exteriorly about and rotatable with said well for the elevation of infed material from the foot of said well through the tank area exterior to the well, means for the continuous removal of elevated material from upper regions of the tank area exterior to the well, a water inflow line delivering to upper regions of the tank area exterior to the well, a solution outflow line upstanding through the tank floor and axially of said well to dispose its intake end at an upper zone of the well interior, a housing exteriorly of said tank across the plane of desired tank liquid level connected through its floor with said outflow line, a cylindrical baffle of less height than the housing closing against the housing floor about the delivery end of said outflow line in an inward spacing from the housing walls, height-determining rings removably and replaceably carried in superposition on the baffle upper margin, an outflow from and adjacent the floor of said housing, and means for maintaining said housing charged with inert gas at atmospheric pressure.

8. Sugar diffusing apparatus comprising a tank adapted to contain liquid, an open-ended, tubular well rotatable about its vertically-disposed axis interiorly of said tank in a spacing of its lower end above the tank floor and an upward extension beyond the tank, means for rotating said well, a spout through the upper end and opening interiorly of said well, a conveyor serving said spout for the continuous infeed of sugar-bearing material thereto, a continuous spiral flight exteriorly about and rotatable with said well for the elevation of infed material from the foot of said well through the tank area exterior to the well, a tube-housed, spiral conveyor engaged at its intake end in an upper region of the tank area exterior to the well and rotatably powered for the continuous removal of elevated material from said region, a water inflow line delivering to upper regions of the tank area exterior to the well, a solution outflow line upstanding through the tank floor and axially of said well to dispose its intake end at an upper zone of the well interior, a housing exteriorly of said tank across the plane of desired tank liquid level connected through its floor with said outflow line, a cylindrical baffle of less height than the housing closing against the housing floor about the delivery end of said outflow line in an inward spacing from the housing walls, height-determining rings removably and replaceably carried in superposition on the baffle upper margin, an outflow from and adjacent the floor of said housing, and means for maintaining said housing charged with inert gas at atmospheric pressure.

References Cited in the file of this patent

UNITED STATES PATENTS

| Number | Name | Date |
|---|---|---|
| 1,515,130 | Morrison | Nov. 11, 1924 |
| 1,543,621 | Ruckstuhl | June 23, 1925 |
| 2,043,409 | Heitmann | June 9, 1936 |
| 2,096,728 | Bighouse | Oct. 26, 1937 |
| 2,321,923 | Levine et al. | June 15, 1943 |
| 2,377,875 | Geissler | June 12, 1945 |
| 2,390,131 | Silver | Dec. 4, 1945 |
| 2,577,135 | Langen | Dec. 4, 1951 |
| 2,602,762 | Langen | July 8, 1952 |
| 2,637,666 | Langen | May 5, 1953 |